United States Patent
Jain et al.

(10) Patent No.: US 7,325,099 B2
(45) Date of Patent: Jan. 29, 2008

(54) METHOD AND APPARATUS TO ENABLE DRAM TO SUPPORT LOW-LATENCY ACCESS VIA VERTICAL CACHING

(75) Inventors: Sanjeev Jain, Shrewsbury, MA (US); Mark B. Rosenbluth, Uxbridge, MA (US); Matthew Adiletta, Bolton, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 10/974,122

(22) Filed: Oct. 27, 2004

(65) Prior Publication Data

US 2006/0090039 A1    Apr. 27, 2006

(51) Int. Cl.
*G06F 12/00* (2006.01)
(52) U.S. Cl. ............................. 711/137; 711/118
(58) Field of Classification Search ................ 711/137, 711/118
See application file for complete search history.

(56) References Cited

U.S. PATENT DOCUMENTS

| | | | |
|---|---|---|---|
| 7,038,972 B2* | 5/2006 | Seo et al. ............... | 365/233 |
| 2003/0152076 A1* | 8/2003 | Lee et al. ............... | 370/389 |
| 2003/0191866 A1* | 10/2003 | Wolrich et al. ......... | 709/313 |
| 2005/0210199 A1* | 9/2005 | Dimpsey et al. ........ | 711/137 |
| 2005/0289551 A1* | 12/2005 | Wojtkiewicz et al. .. | 718/103 |
| 2006/0010339 A1* | 1/2006 | Klein ..................... | 714/5 |

* cited by examiner

*Primary Examiner*—Gary Portka
*Assistant Examiner*—Yong J. Choe
(74) *Attorney, Agent, or Firm*—Blakely, Sokoloff, Taylor & Zafman LLP (57) ABSTRACT

Method and apparatus to enable slower memory, such as dynamic random access memory (DRAM)-based memory, to support low-latency access using vertical caching. Related function metadata used for packet-processing functions, including metering and flow statistics, is stored in an external DRAM-based store. In one embodiment, the DRAM comprises double data-rate (DDR) DRAM. A network processor architecture is disclosed including a DDR assist with data cache coupled to a DRAM controller. The architecture further includes multiple compute engines used to execute various packet-processing functions. One such function is a DDR assist function that is used to pre-fetch a set of function metadata for a current packet and store the function metadata in the data cache. Subsequently, one or more packet-processing functions may operate on the function metadata by accessing it from the cache. After the functions are completed, the function metadata are written back to the DRAM-based store. The scheme provides similar performance to SRAM-based schemes, but uses much cheaper DRAM-type memory.

26 Claims, 6 Drawing Sheets

METHOD AND APPARATUS TO ENABLE DRAM TO SUPPORT LOW-LATENCY ACCESS VIA VERTICAL CACHING

FIELD OF THE INVENTION

The field of invention relates generally to memory caching and, more specifically but not exclusively relates to techniques for enabling the use of general-purpose memory for low-latency operations via a vertical caching scheme.

BACKGROUND INFORMATION

One of the most important considerations for handling network traffic is packet throughput (i.e., bandwidth). Network processors and the like are designed to efficiently process very large numbers of packets per second. In order to process a packet, the network processor (and/or switch equipment employing the network processor) needs to extract data from the packet header indicating the destination of the packet, class of service, etc., store the payload data in memory, perform various overhead functions, etc.

Under a typical packet processing scheme, a packet (or the packet's payload) is stored in a "packet" buffer, while "metadata" used for processing the packet is stored elsewhere in some type of metadata buffer. Whenever a packet-processing operation needs to access the packet or metadata, a memory access operation is performed. Each memory access operation adds to the overall packet-processing latency.

Ideally, all memory accesses would be via the fastest scheme possible. For example, modern on-chip (i.e., on the processor die) static random access memory (SRAM) provides access speeds of 10 nanoseconds or less. However, this type of memory is very expensive (in terms of chip real estate and chip yield), so the amount of on-chip SRAM memory provided with a processor is usually very small. Typical modern network processors employ a small amount of on-chip SRAM for scratch memory and the like.

The next fastest type of memory is off-chip SRAM. Since this memory is off-chip, it is slower to access (than on-chip memory), since it must be accessed via an interface between the network processor and the SRAM store. Thus, a special memory bus is required for fast access. In some designs, a dedicated back-side bus (BSB) is employed for this purpose. Off-chip SRAM is generally used by modern network processors for storing and processing packet metadata, along with storing other temporal processing-related information.

Typically, various types of off-chip dynamic RAM (DRAM) are employed for use as "bulk" memory. Dynamic RAM is slower than static RAM (due to physical differences in the design and operation of DRAM and SRAM cells), and must be refreshed every few clock cycles, taking up additional overhead. As before, since it is off-chip, it also requires a special bus to access it. In most of today's network processor designs, DRAM memory stores with enhanced performance are employed, including RDRAM (Rambus DRAM) or DDR DRAM (double data rate), RLDRAM (reduced latency RAM) etc. via dedicated signals. As used herein, a memory store comprises one or more memory storage devices having memory spaces that are managed as a common memory space.

In consideration of the foregoing characteristics of the various types of memory, network processors are configured to store packet data in slower bulk memory (e.g., DRAM), while storing metadata in faster memory comprising SRAM. Accordingly, modern network processors usually provide built-in hardware facilities for allocating and managing metadata buffers and access to those buffers in an SRAM store coupled to the network processor. Furthermore, software libraries have been developed to support packet-processing via microengines running on such network processors, wherein the libraries include packet-processing code (i.e., functions) that is configured to access metadata via the built-in hardware facilities.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4a is a flowchart illustrating operations performed so facilitate metering and flow statistics functions using the network processor architecture of FIG. 3a;

DETAILED DESCRIPTION

Embodiments of methods and apparatus for enabling the use of general-purpose memory for low-latency operations via a vertical caching scheme are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Modern network processors, such as Intel's® IXP2xxx family of network processors, employ multiple multi-threaded processing elements (e.g., microengines) to facilitate line-rate packet processing operations. Some of the operations on packets are well defined, with minimal interface to other functions or strict order implementation. Examples include update-of-packet-state information, such as the current address of packet data in a DRAM buffer for sequential segments of a packet, updating linked-list pointers while enqueuing/dequeuing for transmit, and policing or marking packets of a connection flow. In these cases the operations can be performed within the predefined-cycle stage budget. In contrast, difficulties may arise in keeping operations on successive packets in strict order and at the same time achieving cycle budget across many stages. A block of code performing this type of functionality is called a context pipe stage.

Figure 1:
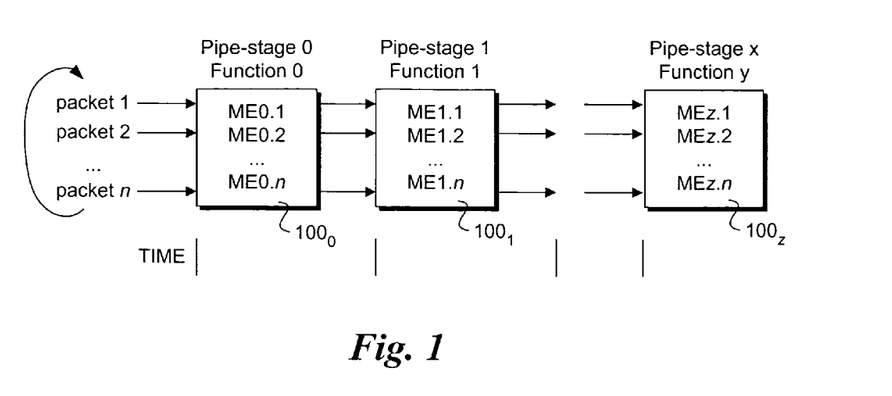
FIG. 1 is a schematic diagram illustrating a technique for processing multiple functions via multiple compute engines using a context pipeline.

In a context pipeline, different functions are performed on different microengines (MEs) as time progresses, and the packet context is passed between the functions or MEs, as shown in FIG. 1. Under the illustrated configuration, z MEs $100_{0-z}$ are used for packet processing operations, with each ME running n threads. Each ME constitutes a context pipe stage corresponding to a respective function executed by that ME. Cascading two or more context pipe stages constitutes a context pipeline. The name context pipeline is derived from the observation that it is the context that moves through the pipeline.

Under a context pipeline, each thread in an ME is assigned a packet, and each thread performs the same function but on different packets. As packets arrive, they are assigned to the ME threads in strict order. For example, there are eight threads typically assigned in an Intel IXP2800® ME context pipe stage. Each of the eight packets assigned to the eight threads must complete its first pipe stage within the arrival rate of all eight packets. Under the nomenclature illustrated in FIG. 1, MEi.j, i corresponds to the ith ME number, while j corresponds to the jth thread running on the ith ME.

A more advanced context pipelining technique employs interleaved phased piping. This technique interleaves multiple packets on the same thread, spaced eight packets apart. An example would be ME0.1 completing pipe-stage 0 work on packet 1, while starting pipe-stage 0 work on packet 9. Similarly, ME0.2 would be working on packet 2 and 10. In effect, 16 packets would be processed in a pipe stage at one time. Pipe-stage 0 must still advance every 8-packet arrival rates. The advantage of interleaving is that memory latency is covered by a complete 8 packet arrival rate.

According to aspects of the embodiments now described, novel caching schemes is implemented that enables a DRAM-based storage scheme to perform in a manner similar to an SRAM-based memory store. The schemes are implemented via a context pipelining technique under which a first compute engine (e.g., microengine) is used to launch a thread that pre-fetches function metadata related to a packet that is currently being processed. The function metadata is stored in a DRAM-based store, and is pre-fetched into a low-latency on-chip data cache. Subsequently, packet-processing operations that operate on the pre-fetched function metadata are performed via threads executing on other compute engines in a pipelined manner.

During packet-processing operations, metadata are extracted from the external low latency memory based on headers of incoming packets. After updates based on the received packet information, the meta data are written back to external SRAM memory. Meanwhile, the packet data are stored in higher-latency bulk memory, usually comprising some form of DRAM. The metadata is used for performing various tasks, including routing, queuing/dequeuing, class of service (CoS) operations including classification, metering, and traffic shaping, congestion avoidance, scheduling, and transmit, etc. It is common for metadata to be accessed multiple times during the processing of a given packet, thus the need for storing the metadata in low-latency memory.

Ideally, it would be advantageous to cache CoS- and flow-related data in some on chip cache. However, in general, network traffic is often unpredictable, and therefore is very difficult to use caching for flows or queues. For example, if a packet for a Q10/Flow2000 is received, chances are that a similar packet will not be received for a while, especially since there are about 512,000 queues and a couple of million flows in the Internet network. The net result is that there is generally insufficient storage space allocated to SRAM to service this purpose.

In accordance with aspects of some embodiments, a vertical caching scheme is implemented to enable metadata related to QoS and flow functions, referred to herein as "function metadata", to be pre-fetched from DRAM-based storage into an on-chip cache. The scheme further stores the function data in sets, wherein a given set of function metadata is used to support multiple packet-processing functions.

However, it is still possible to read a set of variables in a single read because as a packet goes through different stages of classification, metering, congestion avoidance, queuing, scheduling, shaping and transmit, various function metadata (variables) will be retrieved (read), modified, and written. It has been observed that these variables are often related. For example, if an indexed data structure comprising a set of queue-related parameters is employed, then congestion avoidance and queue statistics that work on the same queue index-related data structure can use a single read request in place of issuing different reads, as is required using conventional approaches. Similarly, flow-based parameters like flow-based metering and flow-based stats can be combined in a set and read together in place of issuing different reads.

Consider that in one embodiment DRAM memory burst size is 32(B)ytes; therefore it is advantageous to group functions to make use of this burst size most effectively. For example, in one embodiment a Flow Metering data structure is 16 B long and Flow Statistics (bytes and packet count) is also 16 B long for a 64-bit statistics function and these functions are accessed using the same handle called "Flow ID". Therefore if these variables are stored together in DRAM and accessed in a single read burst, DRAM bandwidth will be utilized most effectively. Furthermore, if these parameters were to be stored in SRAM memory, a full channel of 200 MHz QDR (Quad data-rate) memory would be required to be used, leaving very little bandwidth available for other important functions.

Figure 2:
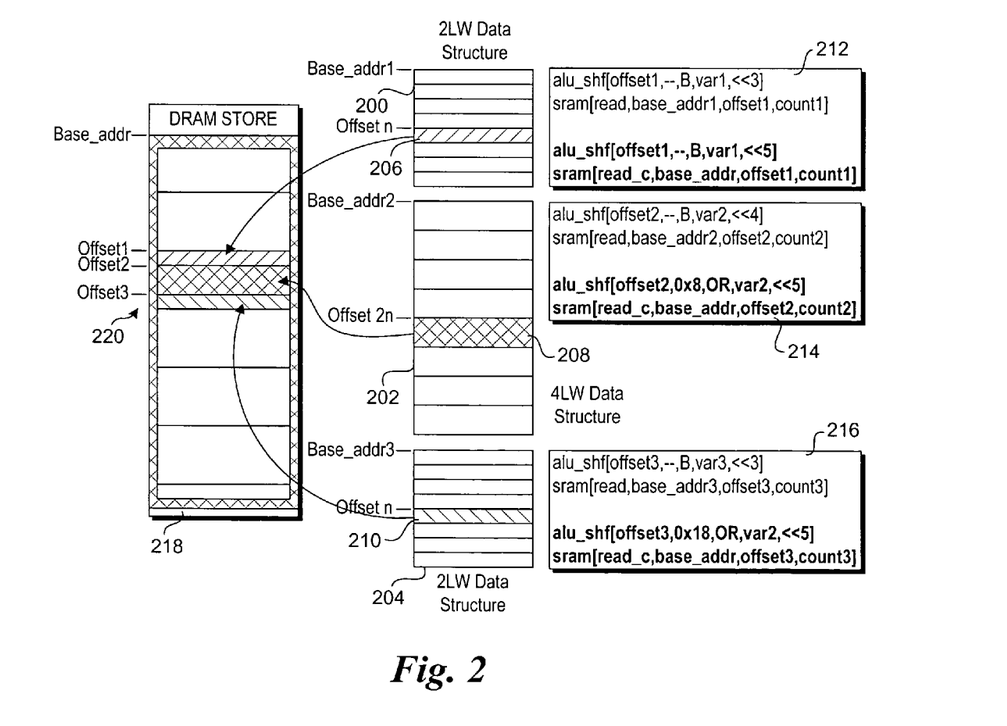
FIG. 2 is a schematic diagram illustrating a data storage scheme under which related function metadata are stored in sets, according to one embodiment of the invention.

An exemplary storage scheme to support vertical caching is shown in FIG. 2. Under this scheme, related function metadata are grouped into sets, wherein a given set of function metadata are used by multiple packet-processing functions during the processing of a corresponding packet. Accordingly, a set of function metadata can be accessed using a single index and a single read.

FIG. 2 also illustrates the difference between the function metadata set storage scheme and the conventional approach. More specifically, the conventional storage scheme is shown in the middle of the diagram. The conventional scheme employs respective blocks of memory for storing metadata pertaining to a particular function. For illustrative purposes, three blocks are shown, including a first function metadata storage block 200, a second function metadata storage block 202, and a third function metadata storage block 204. Each of storage blocks 200 and 204 store respective data segments comprising two long word (2LW) data structures, while storage block 202 employs a 4LW data structure. The indexes for each of the storage blocks are related using a common factoring scheme, wherein the location of the data segments for a particular index are offset as a multiple of a base index from the base address for the storage block, with the multiple determined by the length of the data segment. For example, the location of a 2LW data segment 206 in storage block 200 is offset by "n" from a base address of Base_addr1. Likewise, the location of a corresponding 2LW data segment 210 in storage block 204 is offset by n. Meanwhile, the location of a corresponding 4LW data segment 208 in storage block 202 is offset by 2n.

Under the conventional approach, each of data segments 206, 208, and 210 is accessed separately using the exemplary non-bolded instructions shown in code blocks 212, 214, and 216, respectively. The exemplary code illustrates a read operation from an SRAM store, wherein an SRAM read operations references the base address, offset, and count (e.g., size) for the data segment). Accordingly, in order to retrieve data segments 206, 208, and 210, three separate SRAM read operations are employed.

Under the vertical caching scheme, the related data segments are stored in respective sets in a DRAM store 218, such as depicted by a function metadata set 220 having a size of 8LW. As explained in further detail below, during packet processing operations sets of function metadata are pre-fetched from DRAM store 218 into a local (on-chip) cache. The latency performance of the on-chip cache is similar to that provided by an SRAM store. In one embodiment, a simple SRAM read function (sram[read_c . . . ]) is employed for reading the local cache, as exemplified by the bolded instructions in code blocks 212, 214, and 216.

Figure 3A:
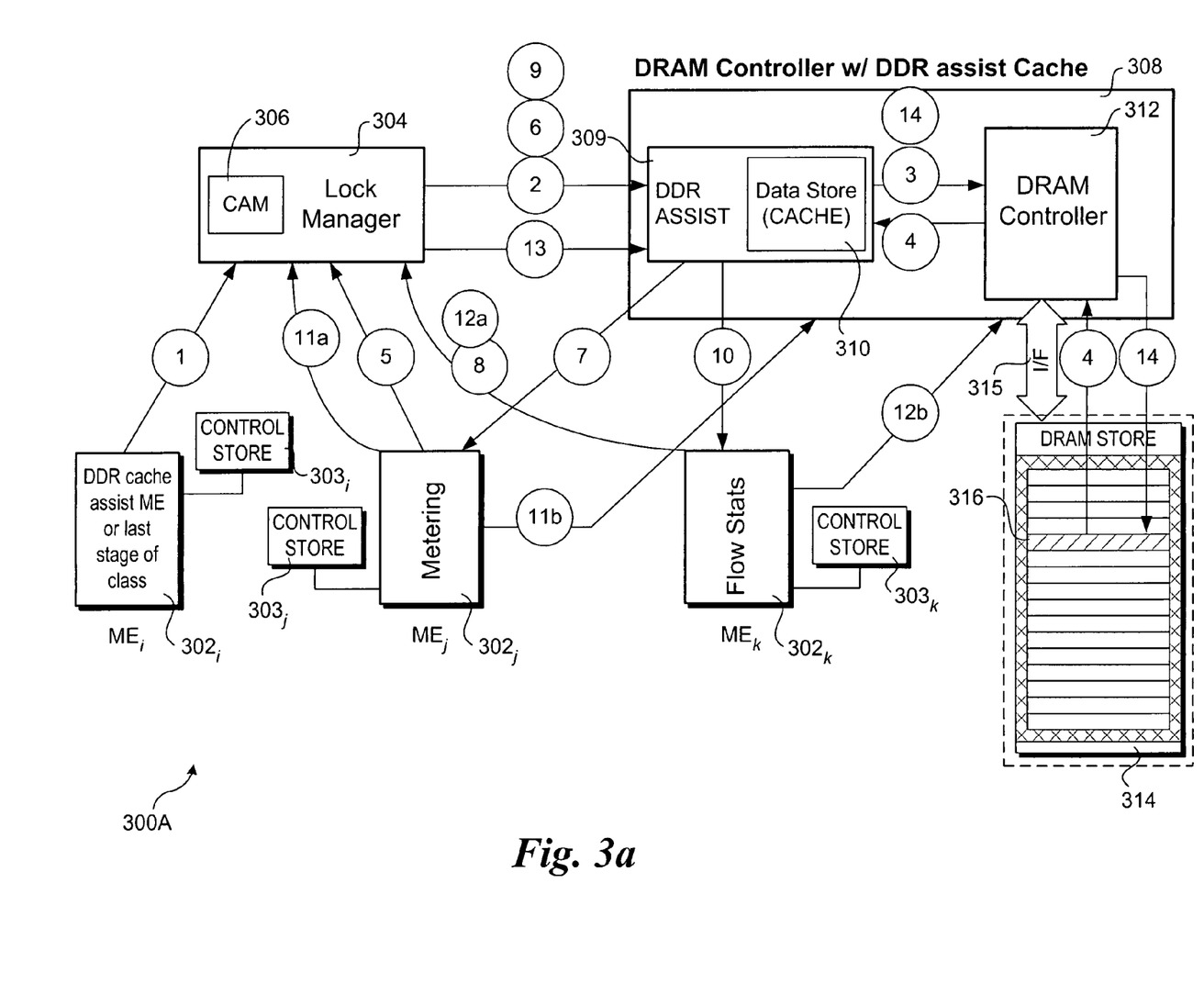
FIG. 3a is a schematic flow diagram illustrating an operations of a network processor architecture to perform metering and flow statistics functions using data that is pre-fetched from an external DRAM store and cached in a DDR assist component, according to one embodiment of the invention.

FIG. 3a shows one embodiment of a network processor architecture 300A that supports vertical caching of metering and flow statistics function metadata. Under this embodiment, three microengines, including a DDR (double-data rate) cache assist ME $302_i$, a metering ME $302_j$ and a flow statistics (stats) ME $302_k$ are employed. The subscripts of the microengines, i, j, and k are used to illustrate that any three microengines from a set of microengines may be used. For example, in a network processor having eight microengines, any combination of three microengines may be used. As described below, the actual microengines that are to be employed may be selected in view of memory latency "tuning" considerations.

Network processor architecture 300a also includes a lock manager (LM) 304 that includes a content-addressable memory (CAM) 306. The lock manager 304 interacts with an DRAM controller with cache 308 that includes a DDR assist 309 hosting a data store 310 and a DRAM controller 312. The DRAM controller 312 is used to access (e.g., read, write, etc.) data stored in an attached (external) DRAM store 314. In general, the function metadata are stored in a DRAM physical address space, wherein particular data segments may be accessed by a corresponding address or a base address plus an offset address. In one embodiment, DRAM store 314 comprises DDR RAM.

Respective threads on each of microengines $302_i$, $302_j$ and $302_k$ are used to perform a specific packet processing-related function. These functions include a DDR cache assist function for DDR cache assist ME $302_i$, a metering function for metering ME $302_j$, and a flow statistics function for flow stats ME $302_k$. Meanwhile, it will be understood other threads on other microengines (not shown) are employed to perform ongoing general packet-processing operations (not shown) using well-known techniques. Each thread running on microengines $302_i$, $302_j$ and $302_k$ comprises a set of instructions that is loaded for a respective local control store $302_i$, $302_j$ and $302_k$. In general, the instructions in the control stores may be loaded into the control stores during network processor initialization, either from a local non-volatile store (e.g., flash memory), an external non-volatile store (e.g., a disk drive), or via a network download as a carrier wave.

Figure 4A:
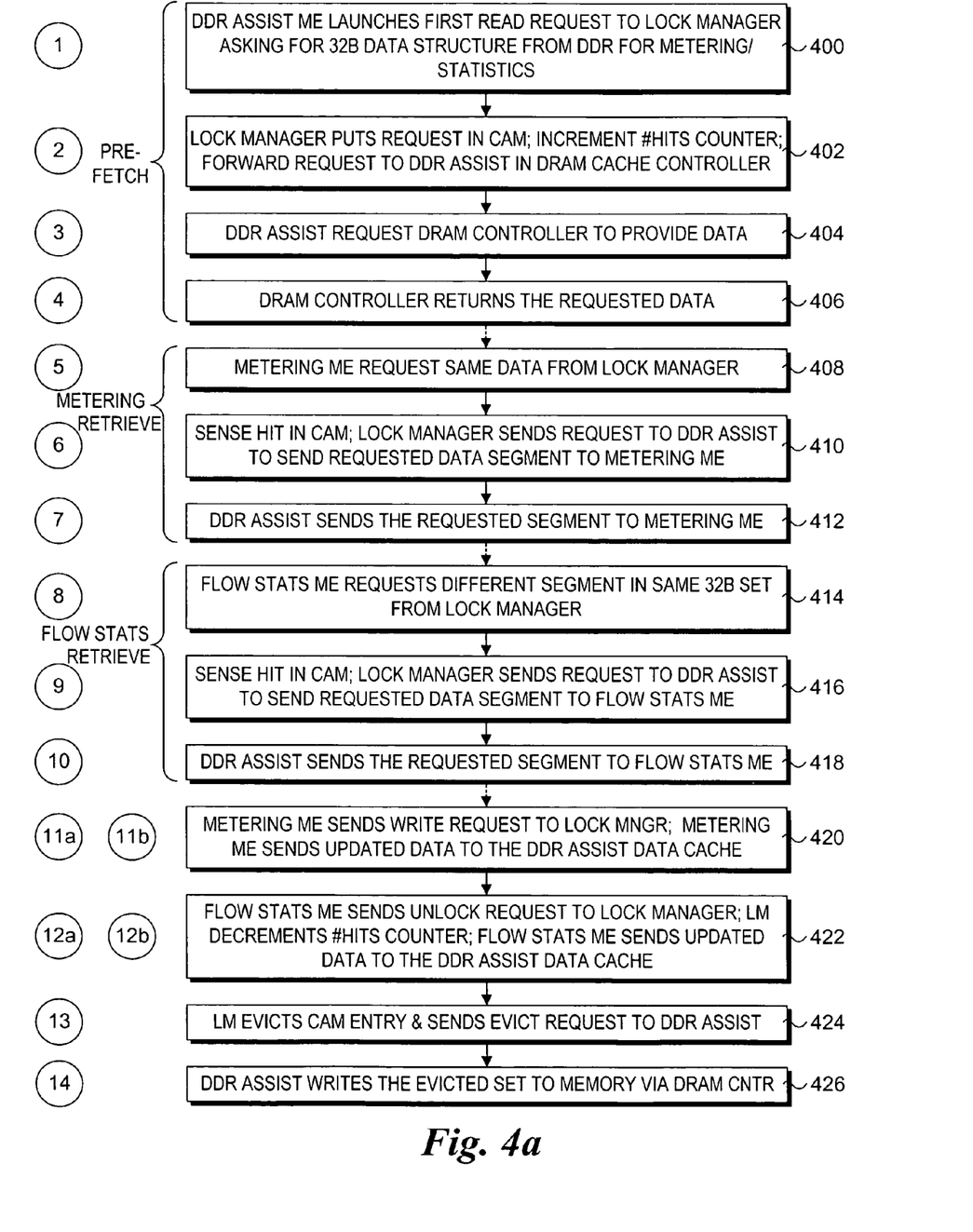

The flowchart of FIG. 4a shows operations performed by network processor architecture 300A to perform metering and flow statistics using vertical caching, according to one embodiment. The first set of operations depicted in blocks 400, 402, 404, and 406 are used to perform a pre-fetch operation to retrieve a data structure (dataset) that contains metering and flow statistics function metadata. These operations begins in block 400, wherein the DDR assist ME $402_i$ launches a first read request (depicted by an encircled "1") to lock manager 304 asking for a 32 bytes (B) data structure 216 stored in DRAM store 314. This data structure contains data relating to metering and flow statistics functions. It is noted that the use of a 32 B data structure is merely exemplary, as other size data structures may be used in a similar manner.

In response to receiving the read request, the lock manager puts the request to CAM 306, as depicted in block 402. CAM 306 is used to identify cached data structures stored in data store 310, which serves as a data cache. Since this is the first read request, the requested data will not be cached at this point. The lock manager also increments a counter indicating the number of metering/flow statistics sets working on the current variable set. The lock manager then forwards the read request to DDR assist 309, as depicted by an encircled "2".

In response to the read request, DDR assist 309 forwards the request (encircled "3") to DRAM controller 312 to provide the corresponding data, as depicted in block 404, with the DRAM controller retrieving the data from DRAM store 314 and returning the data (encircled "4") to DDR assist 309 in block 406.

A flow (or connection) is metered to ensure that the bandwidth allocation configured for the class to which the traffic belongs is not exceeded. In general, metering operations are performed by one or more threads running on metering ME $202_j$. In one embodiment, the metering operations for a particular packet are coordinated such that they do not begin until a pre-determined amount of time has passed since the operation of block 300 is initiated. This amount of time corresponds to the predicted DRAM read access latency, which also includes latencies incurred by passing the request between lock manager 304, DDR assist 309, and DRAM controller 312. In one embodiment, a pipelined synchronization scheme is employed, wherein thread timing is employed such that the metering thread requests access to the pre-fetched function metadata set immediately after it is input to data store 310.

After expiration of the predetermined latency, the metering ME $202_j$ requests the same data (that was previously retrieved and cached in data store 310, depicted by an encircled "5") from lock manager 304, in a block 408. In a block 410, the lock manager checks its CAM 306, and senses a hit (i.e., the CAM indicates that requested data is currently cached in data store 310). The lock manager then sends a request to DDR assist 309 to send the requested data segment to metering ME 302$_j$. This request is depicted by an encircled "6". In response to the request, the DDR assist retrieves the segment from data store 310 and sends it to metering ME 300$_j$, as depicted in a block 412 and an encircled "7".

Another function performed during packet-processing is flow statistics. Among other uses, flow statistics are employed for understanding both characteristics of source traffic, and consumption of resources in the network. The flow statistics obtained may be used to enhance traffic management, verify bandwidth consumption, and other tasks performed by a network element employing one or more network processors having an architecture in accordance with network processor architecture 200A.

An exemplary flow statistics data retrieval process is depicted in blocks 414, 416, and 418. In general, the initiation of the process may be synchronized with other packet-processing operations (for example, the foregoing metering operations), or may be asynchronous. In one embodiment, the flow statistics data retrieval process is initiated following expiration of a predetermined expected latency. For example, this time delay may be based on retrieval of the 32 B set from the DRAM store, or it may be based on when the metering ME initiates its request to the lock manager for the cached data set. It is noted that different functions may operate on different function metadata segments within a common cached function metadata set. Thus, different ME threads may operate on these different function metadata segments concurrently.

The flow statistics retrieval process begins in block 414, wherein the flow stats ME 302$_k$ requests a different segment in the same 32 B function metadata set from lock manager 404. In one embodiment, the 32 B set is identified by a packet ID, which, in turn, may be forwarded to flow stats ME 302$_k$ from another microengine, such as metering ME 302$_j$, for example. This request is depicted by an encircled "8".

Upon receiving the request, the lock manager 304 senses a hit in its CAM 306 in a block 416. The lock manager then sends a request to DDR assist 309 to send the requested data segment to the flow stats ME 302$_k$, as depicted by an encircled "9". In response to the request, the DDR assist retrieves the segment from data store 310 and sends it to flow stats ME 300$_k$, as depicted in a block 418 and an encircled "10".

After metering ME 302$_j$ is completed with its data segment, it sends a write request to lock manager 304, as depicted by an encircled "11a" and a block 420. The Metering ME then sends any data it desires to update to data store 310 in DDR assist 309, as depicted by an encircled "11b".

After flow stats ME 302$_k$ is done with its data, it sends any data it desires to update to data store 310 in DDR assist 309, as depicted by an encircled "11b". After this flow stats ME also sends an unlock request to lock manager 304, as depicted by an encircled "12a" and a block 422. In response, the lock manager decrements its number of hits counter.

Since the counter is now at "0" (assumed in this example), the entry is a candidate for eviction from data store 310. Subsequently when lock manager needs the entry to store a newly received request, lock manager makes room for the new request by evicting the entry whose hit count is at zero. For this lock manager 304 sends an evict request to DDR assist 309 in a block 424, as depicted by an encircled "13".

The DDR assist then writes the evicted data set to DRAM store 314 via DRAM controller 312, as depicted by an encircled "14".

Figure 3B:
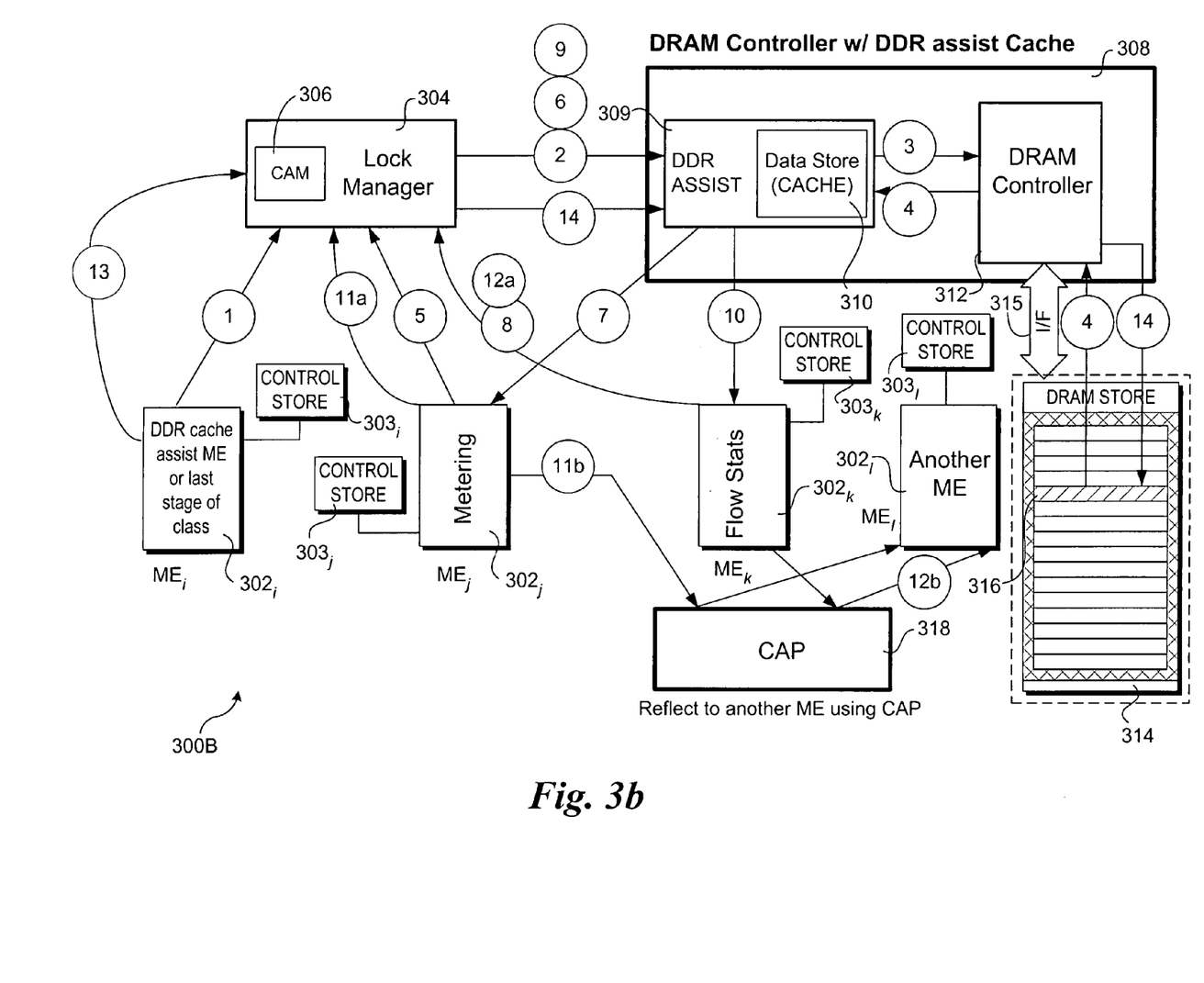
FIG. 3b is a schematic flow diagram similar to that shown in FIG. 3a, further including a Control Status Register Access Proxy (CAP) use to reflect data from one compute engine to another compute engine, according to one embodiment of the invention.

FIG. 3b shows a network process architecture 300B that is similar to that shown in architecture 300A of FIG. 3b, wherein like components share common reference numbers. In addition to the aforementioned components of architecture 300A, architecture 300B further includes a CAP (Control Status Register Access Proxy) 318, and an additional ME 302$_l$. As described below in further detail, CAP 318 enables data to be passed from one microengine to another.

When multiple microengines share the same function in that case coherency of update has to be maintained such that update happen in the same order in which packets are received. For this to work, lock manager uses an indirect scheme where it sends the updated data to some other requester (ME/Thread#) in place of sending it to a DRAM Store. This way, data is processed by different ME/Threads in the packet arrival order.

In one embodiment, CAP 318 is used, in conjunction with other components of architecture 300B, to forward cached data between microengines in a manner that bypasses DDR assist 309. Referring now to the flowchart of FIG. 4b, one embodiment of a corresponding operational sequence begins with the operations of blocks 400, 402, 404, 406, 408, 410, 412, 414, 416, and 418 being performed in a similar manner to that described above. During this phase of the process, the data structure is pre-fetched and cached, the metering data is retrieved from the cache, and the flow statistics data is retrieved from the cache.

Figure 4B:
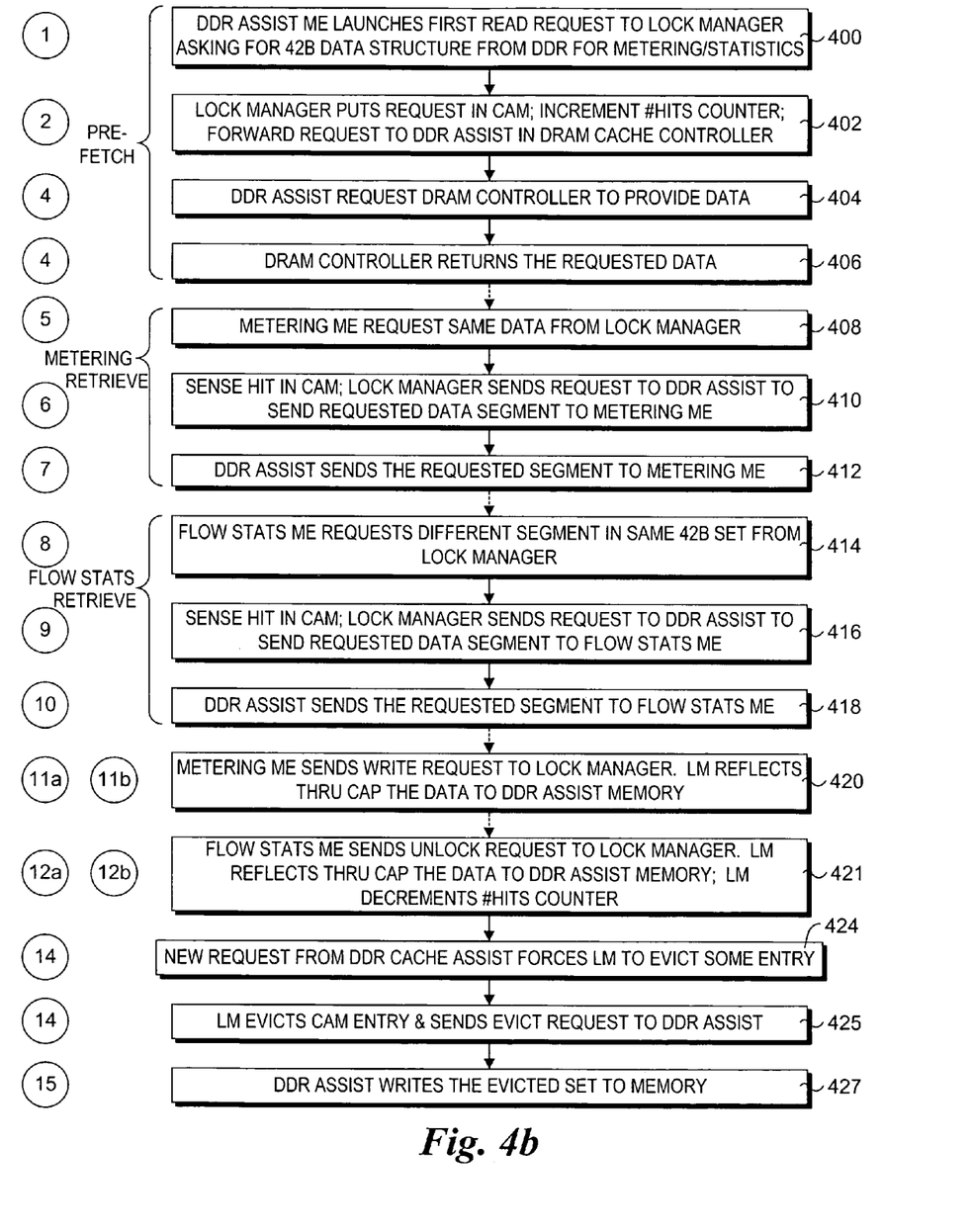
FIG. 4b is a flowchart illustrating operations performed so facilitate metering and flow statistics functions using the network processor architecture of FIG. 3b.

Subsequently, after metering ME 302$_j$ is completed with its data segment, it sends a write request to lock manager 304, as depicted by an encircled "11a" and a block 421. The write requests includes any updated data the metering ME desires to update. The lock manager then reflects this data through CAP 318 to ME 302$_l$, as depicted by an encircled "11b".

After flow stats ME 302k is done with its data, it sends an unlock request to lock manager 304, as depicted by an encircled "12a" and a block 423. The lock manager then reflects the data to ME 302, via CAP 318, as depicted by an encircled "12b". Following this, the lock manager decrements the hits counter for this entry. As before, if the counter is at "0", the entry is a candidate for eviction.

At some later point, a new request is received from the DDR cache assist ME 302$_i$ that forces lock manager 304 to evict some entry, as depicted by an encircled "13" and a block 425. In response in a block 425, the lock manager evicts an entry from its CAM 306, and sends an evict request to DDR assist 309 to evict a corresponding entry in data store 310. The evict request is depicted by an encircled "14." The process is completed in a block 427, wherein DDR assist 309 writes the evicted data set to DRAM store 314 via DRAM controller 312, as depicted by an encircled "15".

Figure 5:
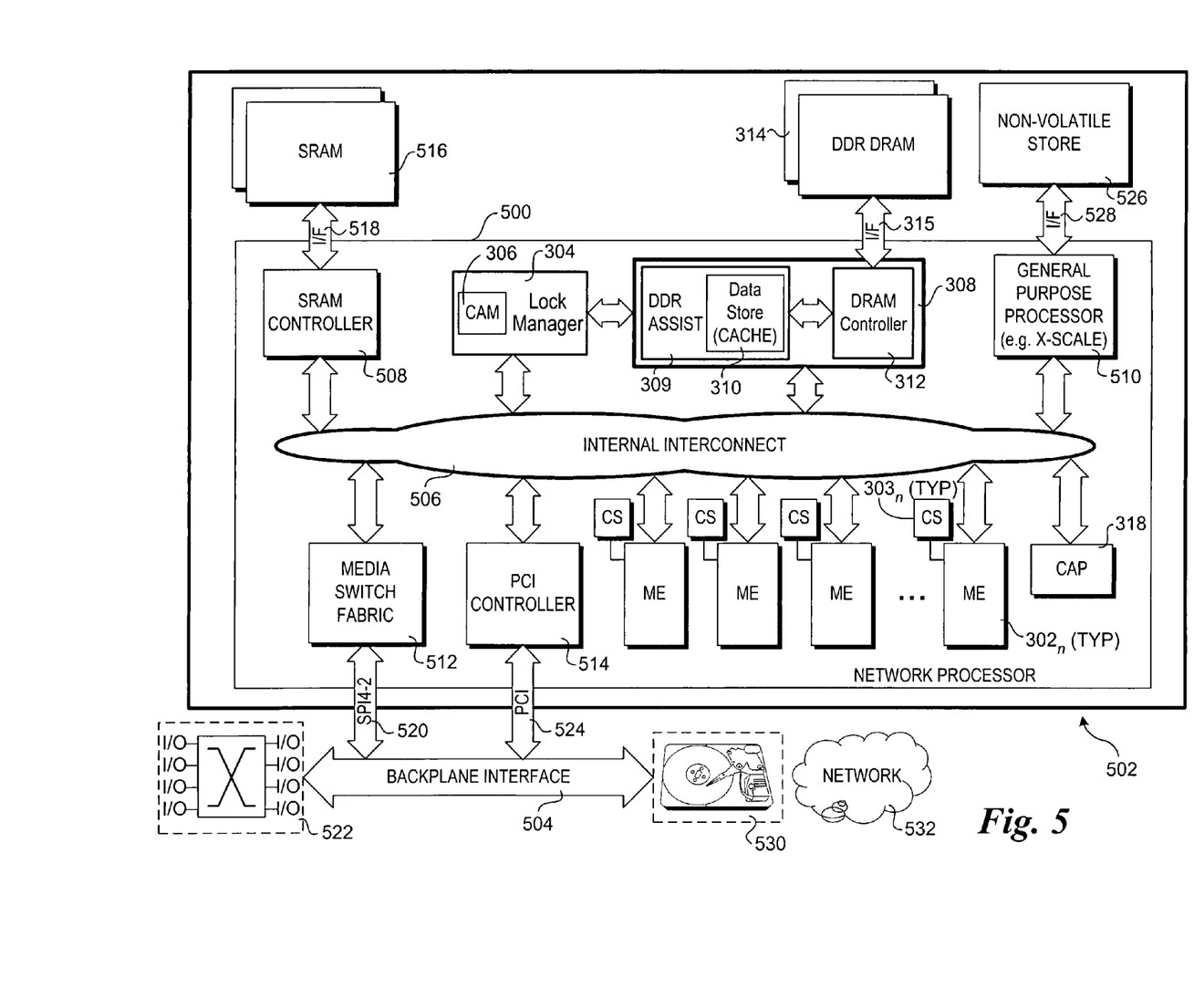
FIG. 5 is a schematic diagram of a line card that includes a network processor that implements the network processor architectures of FIG. 3a or 3b.

FIG. 5 shows an exemplary implementation of a network processor 500 that employs elements of the network processor architectures of FIGS. 3a and 3b. In this implementation, network processor 500 is employed in a line card 502. In general, line card 502 is illustrative of various types of network element line cards employing standardized or proprietary architectures. For example, a typical line card of this type may comprises an Advanced Telecommunications and Computer Architecture (ATCA) modular board that is coupled to a common backplane in an ATCA chassis that may further include other ATCA modular boards. Accordingly the line card includes a set of connectors to meet with mating connectors on the backplane, as illustrated by a backplane interface 504. In general, backplane interface 504 supports various input/output (I/O) communication channels, as well as provides power to line card 502. For simplicity, only selected I/O interfaces are shown in FIG. 5, although it will be understood that other I/O and power input interfaces also exist.

Network processor 500 includes multiple microengines $302_n$. In the illustrated embodiment, each of microengines $302_n$ executes instructions stored in a respective control store $303_n$. In another embodiment, control stores may be shared between two or more microengines. Generally, the microengines may be configured as a single set, or may be clustered in groups of microengines.

Each of microengines $302_n$ is connected to other network processor components via sets of bus and control lines referred to as the processor "chassis". For clarity, these bus sets and control lines are depicted as an internal interconnect 506. Also connected to the internal interconnect are an SRAM controller 508, a lock manager 304 with CAM 306, a DRAM controller with cache 308, a general purpose processor 510, a media switch fabric interface 512, a PCI (peripheral component interconnect) controller 514, and a CAP 318.

The SRAM controller 508 is used to access an external SRAM store 516 via an SRAM interface 518. DRAM controller with cache 308 is configured in a similar manner to that shown in FIGS. 3a and 3b, as discussed above, and includes a DDR assist 309 hosting a data store 310 communicates with a DRAM controller 312. DRAM controller 312 is used to access an external DRAM store 314 via DRAM interface 315. In one embodiment, DRAM store 314 employs DDR DRAM.

General-purpose processor 510 may be employed for various network processor operations. In one embodiment, control plane operations are facilitated by software executing on general-purpose processor 510, while data plane operations are primarily facilitated by instruction threads executing on microengines $302_n$.

Media switch fabric interface 512 is used to interface with the media switch fabric for the network element in which the line card is installed. In one embodiment, media switch fabric interface 512 employs a System Packet Level Interface 4 Phase 2 (SPI4-2) interface 520. In general, the actual switch fabric may be hosted by one or more separate line cards, or may be built into the chassis backplane. Both of these configurations are illustrated by switch fabric 522.

PCI controller 514 enables the network processor to interface with one or more PCI devices that are coupled to backplane interface 504 via a PCI interface 524. In one embodiment, PCI interface 524 comprises a PCI Express interface.

During initialization, coded instructions to facilitate the packet-processing functions and operations described above are loaded into control stores $303_n$. In one embodiment, the instructions are loaded from a non-volatile store 526 hosted by line card 502, such as a flash memory device. Other examples of non-volatile stores include read-only memories (ROMs), programmable ROMs (PROMs), and electronically erasable PROMs (EEPROMs). In one embodiment, non-volatile store 526 is accessed by general-purpose processor 510 via an interface 528. In another embodiment, non-volatile store 526 may be accessed via an interface (not shown) coupled to internal interconnect 506.

In addition to loading the instructions from a local (to line card 502) store, instructions may be loaded from an external source. For example, in one embodiment, the instructions are stored on a disk drive 530 hosted by another line card (not shown) or otherwise provided by the network element in which line card 502 is installed. In yet another embodiment, the instructions are downloaded from a remote server or the like via a network 532 as a carrier wave.

Thus, embodiments of this invention may be used as or to support software/firmware instructions executed upon some form of processing core (such as microengines $302_n$) or otherwise implemented or realized upon or within a machine-readable medium. A machine-readable medium includes any mechanism for storing or transmitting information in a form readable by a machine (e.g., a compute engine). For example, a machine-readable medium can include such as a read only memory (ROM); a random access memory (RAM); a magnetic disk storage media; an optical storage media; and a flash memory device, etc.

Network processors that include the foregoing vertical caching support architectures and network element equipment such as line cards employing these network processors provide several advantageous over the prior art. The novel vertical caching scheme enables a bulk DRAM-based store to be used to store much larger amounts of function metadata than could be practically stored in an SRAM store under the conventional approach. By pre-fetching selected sets of function metadata into the data cache, the function metadata may be subsequently accessed by one or more packet-processing functions with an access latency that is similar to the access latency for SRAM memory. The additional components consume very little network processor real-estate, and the use of vertical caching requires minimal changes to the existing packet processing function libraries.

The principles described herein may be applied for other purposes, and employ other types of memory stores. For example, although the embodiments illustrated herein refer to implementations with DRAM-based memory stores, the schemes may generally be extended to support any type of memory store. The techniques may also be employed for other types of processing environments in addition to the network processor environments illustrated herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   receiving a packet;
   storing packet-processing function metadata for the packet in an off-chip memory store;
   identifying a class of service for the packet;
   launching a first thread on a first compute engine to pre-fetch selected function metadata corresponding to the class of service into an on-chip cache;
   pre-fetching the selected function metadata including the class of service information for the packet from the off-chip memory store with the first thread of the first compute engine and storing the selected function metadata into the on-chip cache;

launching a second thread on a second compute engine;

retrieving at least a portion of the selected function metadata from the on-chip cache with the second thread of the second compute engine; and employing the selected function metadata that is retrieved to perform at least one packet-processing function pertaining to the class of service by the second thread on the second compute engine.

2. The method of claim 1, wherein the first and second compute engines comprise first and second compute engines of a network processor.

3. The method of claim 2, further comprising:

coordinating the launching of the first and second threads such that the function metadata is pre-fetched into the cache just prior to when the second thread retrieves the at least a portion of the metadata based on a predicted memory access latency.

4. The method of claim 1, wherein the at least one packet-processing function includes performing a metering function.

5. The method of claim 1, wherein the at least one packet-processing function includes performing a flow statistics function.

6. The method of claim 1, further comprising:

storing function metadata relating to multiple functions for a common class of service in a single data structure; and pre-fetching the single data structure as the selected function metadata.

7. The method of claim 1, wherein the off-chip memory store comprises double data-rate (DDR) dynamic random access memory.

8. The method of claim 2, further comprising:

reflecting function metadata between compute engines of the network processor.

9. The method of claim 8, wherein the operation of reflecting the function metadata is facilitated by a control status register access proxy (CAP).

10. The method of claim 1, further comprising:

storing sets of related function metadata in corresponding data structures in the off-chip memory store, each data structure including multiple function metadata segments;

retrieving a set of function metadata pertaining to a given packet from the off-chip memory store and caching the set of function metadata in the on-chip cache;

retrieving a first function metadata segment from the set of function metadata that is cached via a first packet-processing function thread; and retrieving a second function metadata segment from the set of function metadata that is cached via a second packet-processing function thread.

11. The method of claim 10, further comprising:

modifying data in the first function metadata segment;

updating the data that are modified in the first function metadata segment in the set of function metadata that is cached;

modifying data in the second function metadata segment;

updating the data that are modified in the second function metadata segment in the set of function metadata that is cached; and writing the set of function metadata back to the dynamic random access memory store.

12. The method of claim 11, further comprising:

tracking usage of function metadata segments from a set of function metadata; and preventing the set of function metadata from being written back to the dynamic random access memory store until all threads operating on the function metadata segments have completed their use of the function metadata segments.

13. An apparatus, comprising:

a dynamic random access memory (DRAM) access component including a (DRAM) controller having a DRAM-based memory interface and a memory access assist block having a data cache;

a lock manager, communicatively-coupled to the DRAM access component;

a plurality of compute engines, each communicatively-coupled to the DRAM access component and the lock manager and having a control store in which instructions are stored, wherein execution of the instructions by the plurality of compute engines performs operations including:

pre-fetching selected function metadata from a DRAM-based memory store coupleable to the DRAM controller and storing the selected function metadata in the data cache;

retrieving at least a portion of the selected function metadata from the data cache; and employing the selected function metadata that is retrieved from the data cache to perform at least one packet-processing function; and a control status register access proxy (CAP) communicatively-coupled to at least two of the compute engines, the CAP to reflect function metadata from a first one of the compute engines to a second one of the compute engines.

14. The apparatus of claim 13, further comprising:

a content addressable memory (CAM), provided by the lock manager.

15. The apparatus of claim 13, wherein the DRAM controller and DRAM-based memory interface support access to a double data-rate (DDR) DRAM memory.

16. The apparatus of claim 13, wherein each of the computer engines supports concurrent execution of multiple threads, and execution of the instructions in the control stores performs operations including:

identifying a class of service for a packet that is received;

launching a first thread on a first compute engine, the first tread used to pre-fetch function metadata corresponding to the class of service from the DRAM-based memory into the data cache;

launching a second thread on a second compute engine, the second thread used to perform a packet-processing function pertaining to the class of service for the packet by retrieving at least a portion of the function metadata that is pre-fetched from the data cache and performing a packet-processing function that operates on the at least a portion of function meta that is retrieved.

17. The apparatus of claim 13, wherein the at least one packet-processing function includes performing a metering function.

18. The apparatus of claim 13, wherein the at least one packet-processing function includes performing a flow statistics function.

19. A tangible machine-readable medium, to provide instructions configured as respective instruction threads, which if executed perform operations comprising:

requesting selected function metadata to be pre-fetched from a dynamic random access memory (DRAM)-based store into a cache via execution of a first thread on a first compute engine;

retrieving at least a first portion of the selected function metadata from the cache via execution of a second tread on a second compute engine;

performing a first function that operates on the at least a first portion of the selected function metadata via execution of the second thread;

updating data in the cache corresponding to any data in the at least first portion of the selected function metadata that are changed by the first function;

retrieving a second portion of the selected function metadata from the cache via execution of a third thread on a third compute engine;

performing a second function that operates on the second portion of the selected function metadata via the third thread; and updating data in the cache corresponding to any data in the second portion of the selected function metadata that are changed by the second function.

20. The tangible machine readable medium of claim 19, wherein the first function comprises one of a metering or flow statistics function.

21. The tangible machine readable medium of claim 19, wherein the first and second functions comprise a metering and a flow statistics function.

22. A network line card, comprising:
a network processor, including,
an internal interconnect;
a backplane interface, coupled to the internal interconnect;
a dynamic random access memory (DRAM) access component including a (DRAM) controller having a double data-rate (DDR) DRAM memory interface and a DDR memory access assist component having a data cache, communicatively-coupled to the internal interconnect;
a lock manager, communicatively-coupled to the DRAM access component;
a plurality of compute engines, each communicatively-coupled to the DRAM access component and the lock manager via the internal interconnect, and each having a control store;

a control status register access proxy (CAP) communicatively-coupled to at least two of the compute engines, the CAP to reflect function metadata from a first one of the compute engines to a second one of the compute engines;
a DDR DRAM store, communicatively-coupled to the DRAM controller via the DDR DRAM interface;
a non-volatile store to store instructions, operatively-coupled to load each of the control stores with selected portions of the instructions via the internal interconnect,
wherein execution of the instructions by the plurality of compute engines performs operations including:
pre-fetching selected function metadata from the DDR DRAM store;
storing the selected function metadata in the data cache;
retrieving at least a portion of the selected function metadata from the data cache; and
employing the selected function metadata that is retrieved to perform at least one packet-processing function.

23. The line card of claim 22, further comprising:
a general-purpose processor, coupled between the non-volatile store and the internal interconnect, the general-purpose processor to assist in loading the control stores with the selected portions of the instructions.

24. The line card of claim 22, wherein the lock manager of the network processor further includes a content addressable memory (CAM).

25. The line card of claim 22, wherein the network processor further includes a static random access memory (SRAM) memory controller with SRAM interface, coupled to the internal interconnect, the line card further including an SRAM store coupled to the SRAM interface.

26. The line card of claim 22, wherein the network processor further includes a System Packet Level Interface (SPI-) based media switch fabric interface, comprising a portion of the backplane interface.

* * * * *

UNITED STATES PATENT AND TRADEMARK OFFICE
CERTIFICATE OF CORRECTION

PATENT NO.       : 7,325,099 B2                                       Page 1 of 1
APPLICATION NO.  : 10/974122
DATED            : January 29, 2008
INVENTOR(S)      : Jain et al.

It is certified that error appears in the above-identified patent and that said Letters Patent is hereby corrected as shown below:

In column 13, at line 7, delete "tread" and insert --thread--.

Signed and Sealed this

Second Day of September, 2008

JON W. DUDAS
*Director of the United States Patent and Trademark Office*